Dec. 14, 1926.

R. D. KING ET AL

1,610,797

TUMBLING MECHANISM

Filed Feb. 26, 1926

R. D. KING ET AL 1,610,797

TUMBLING MECHANISM

Filed Feb. 26, 1926

Patented Dec. 14, 1926.

1,610,797

UNITED STATES PATENT OFFICE.

ROY D. KING, DECEASED, LATE OF CHICAGO, ILLINOIS; BY ANNA G. KING, ADMINISTRATRIX, OF CHICAGO, ILLINOIS, HERBERT J. MELVILLE AND WILLIAM SWIFT LORD, OF EVANSTON, ILLINOIS, ASSIGNORS TO WILLIAMSON CANDY COMPANY, OF CHICAGO, ILLINOIS, A CORPORATION OF ILLINOIS.

TUMBLING MECHANISM.

Original application filed May 25, 1925, Serial No. 32,583. Divided and this application filed February 26, 1926. Serial No. 90,895.

The tumbling mechanism to which our present invention relates may be used in association with other mechanisms for performing other steps or operations in a complete machine for manufacturing in a continuous manner and on a large scale various kinds of confection of a class consisting of a candy core or center, though in some cases this may be omitted, surrounded by a conglomerate layer of nuts, or other granular edibles, cemented to the core and to each other by a binding caramel or chocolate material, the outer layer of nuts surrounding the compacted inner portion being at the conclusion of the tumbling operation adherent to such inner portion but not coated with the cementing material. In our pending application for patent filed May 25, 1925, Serial Number 32,583, of which the present application is a division, we have described such a complete machine, but it will be understood that the tumbling mechanism thereof to which this application particularly relates, is capable of application to other uses, and the brief description of associated mechanism hereinafter given is by way of exemplification of one particular use only, to which the present invention is in no way limited.

Our invention resides in the new organization and arrangement of cooperating parts and members of the tumbling mechanism hereinafter particularly described, and certain incidental novel features of construction which will be apparent from the description given, the essential elements of our invention being more particularly pointed out in the appended claims.

In the accompanying drawings.

Like reference characters indicate like parts in all the figures of the drawings.

Figure 1:
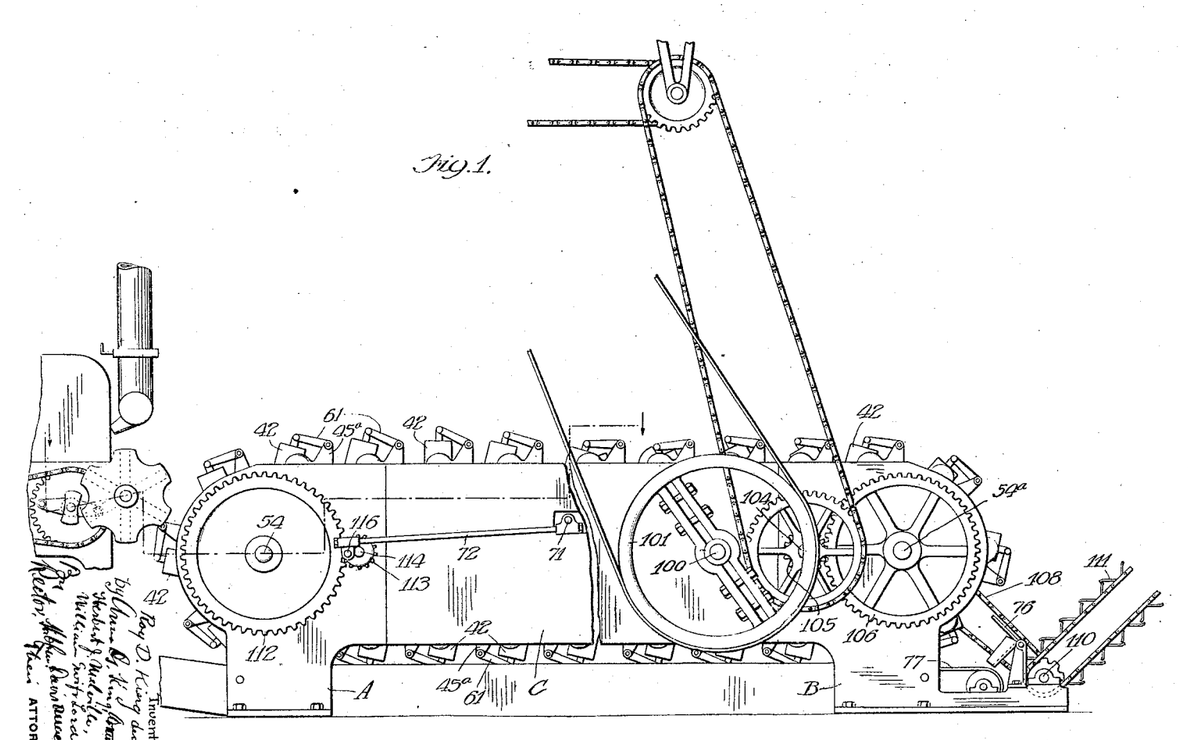
Figure 1 is a right side elevation of our novel tumbling mechanism, employing the term "right" with reference to the positions as viewed from the input or "front" end of the machine (at the left side of said figure) towards the rear or out-put end.
Figure 2:
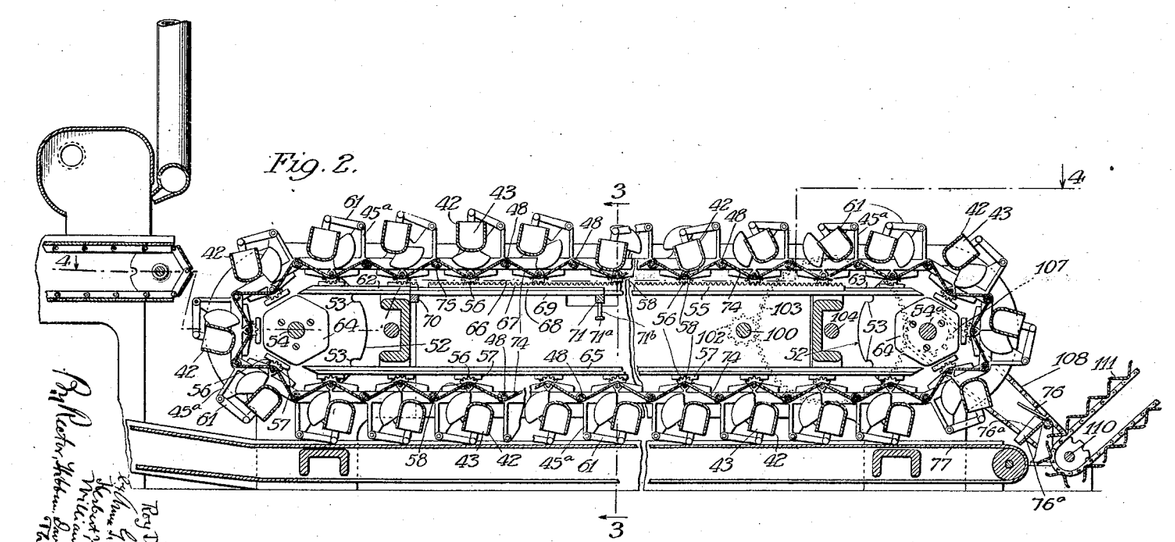
Fig. 2 is a longitudinal central vertical section of such mechanism.
Figure 3:
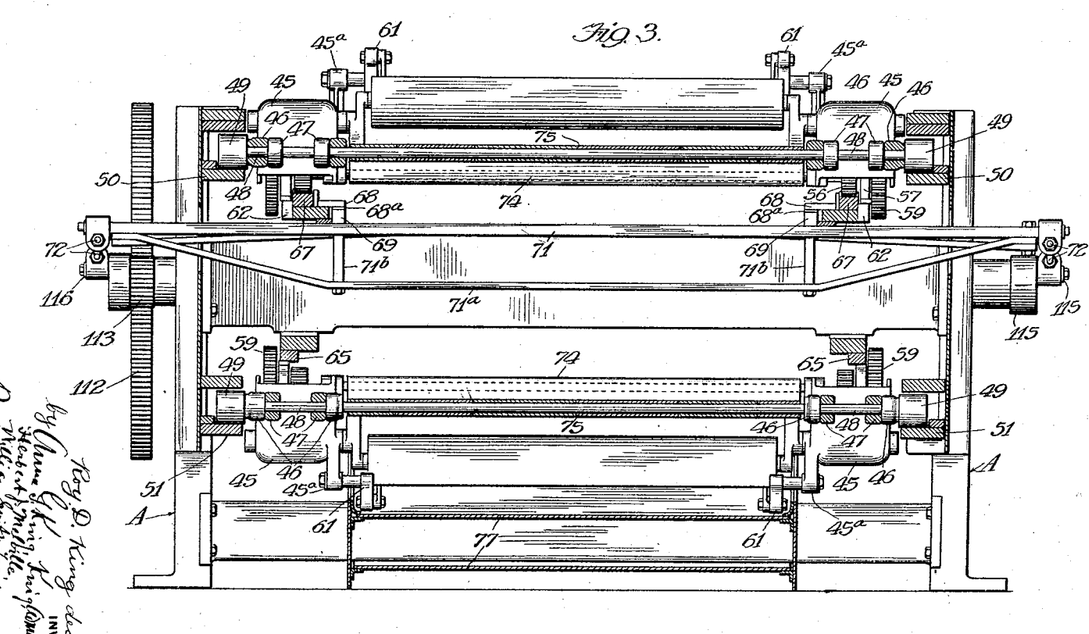
Fig. 3 is a vertical transverse section of the same on the line 3—3 of Fig. 2.
Figure 4:
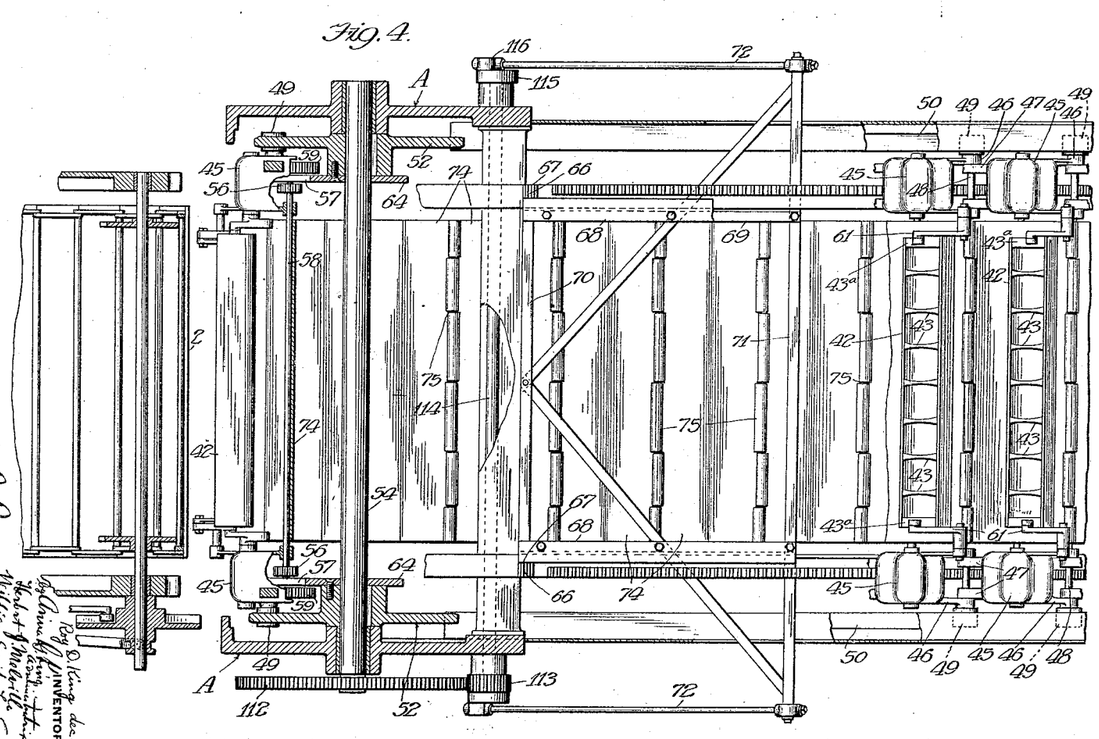
Fig. 4 is a horizontal section of the same in a plane indicated by the dotted line 4—4 of Fig. 2.
Figures 5, 6, 7:
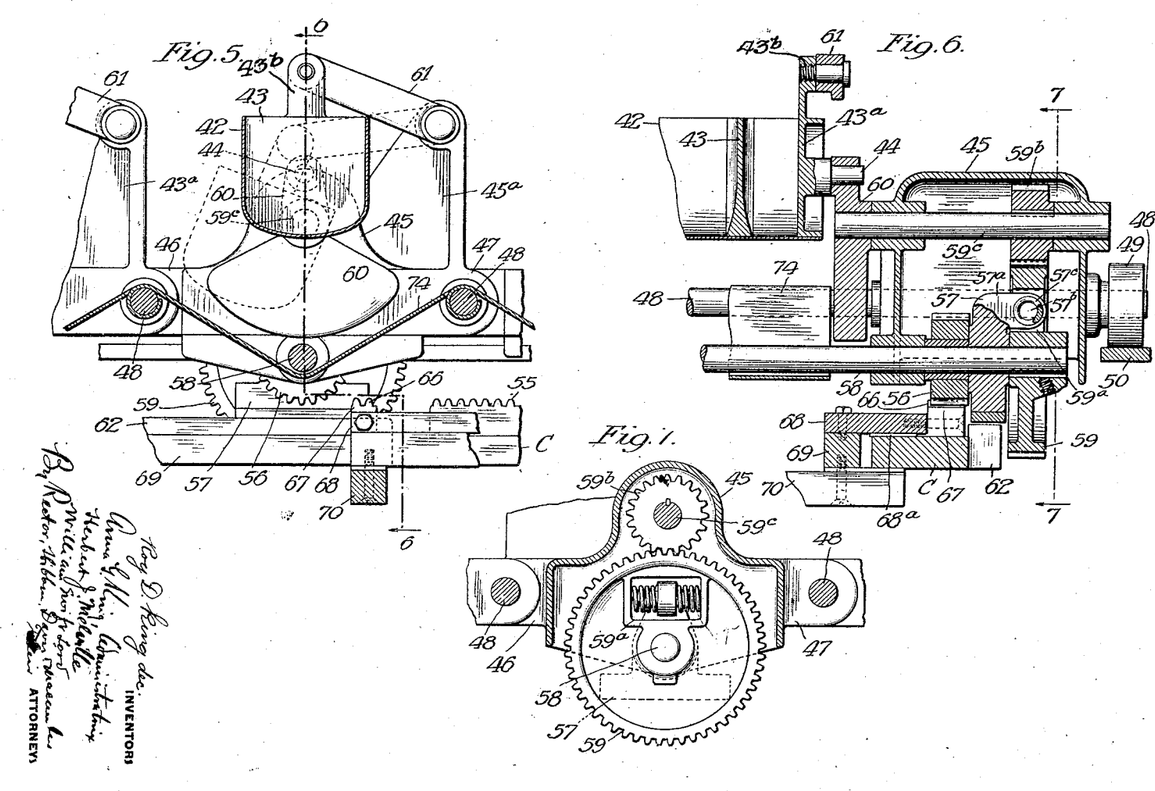
Fig. 5 is a fragmentary vertical section adjacent the front end of one of the bucket-actuating racks, looking towards the left of the machine and showing in elevation parts of one of the gear boxes.
Fig. 6 is a section on the line 6—6 of Fig. 5.
Fig. 7 is a vertical section on the line 7—7 of Fig. 6.
Figure 8:
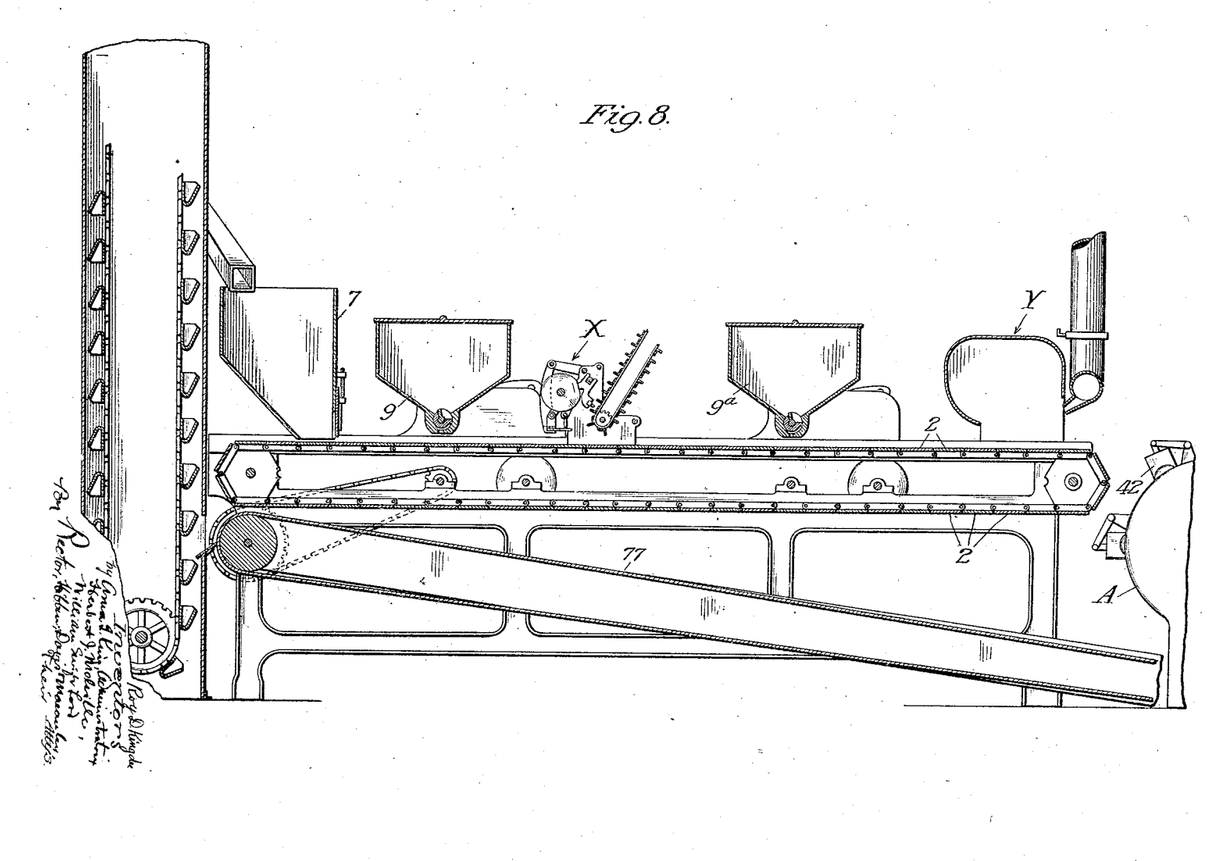
Fig. 8 is a right side elevation of other mechanisms which in a complete machine such as that above mentioned deliver to the tumbling mechanism the materials to be operated upon.

Before describing the tumbling mechanism in detail, a brief description of the instrumentalities illustrated in Fig. 8 for delivering the materials operated upon to the tumbling mechanism may be advantageously given.

At the front end of the machine is arranged an intermittently movable carrier belt 2 upon which, from a supply hopper 7, above the front end of the belt, is laid down a bed of peanuts or other granular material employed in the production of the confection. Rearwardly of the supply hopper is arranged a depositing machine 9 having a transverse row of discharge orifices through which measured charges of the semi-liquid viscous cementing material (generally heated caramel or a chocolate mixture) are intermittently deposited on the bed of nuts at intervals of rest of the carrier belt. Rearwardly of the discharge hopper is arranged mechanism, (marked X as an entirety) for imposing a corresponding row of centers on top of the charges of cementing material, and rearwardly of this mechanism for so placing the centers is arranged a second hopper 9ª arranged to discharge covering charges of the cementing material on top of the centers, these steps also occurring during periods of rest of the belt. Rearwardly of the second hopper the centers thus coated pass beneath a blower mechanism (marked Y as an entirety) having a row of nozzles so disposed that the jets of air passing therethrough act to heap up the loose peanuts adjacent the centers over their top surfaces, and at the rearward loop of the carrier belt the centers, carrying a layer of adherent nuts and surrounded by loose nuts, fall rearwardly into the boxes of the tumbling mechanism.

Describing now in detail the construction of the tumbling mechanism, the tumbling buckets which receive the centers consist in the present instance of a relatively deep round-bottomed and straight-sided sheet metal box or bucket member 42 extending transversely of the machine and divided by means of cross partitions 43 into separate compartments into which the centers are individually dumped. The end walls 43ª of each member 42 are formed with trunnions 44 which are pivotally supported by crank pins carried by opposite crank members rotatably mounted in one of two chains of opposite gear boxes 45. These gear boxes are formed with front and rear pivot lugs or ears, marked 46 and 47, respectively, which are arranged in overlapping relation and are pivoted one to the other upon pivot rods 48 to form a pair of endless chains. These pivot rods extend across the machine and at their opposite ends are equipped with rollers 49 which at the top reach of the tumbling box belt ride upon a track rail 50, and at the bottom reach ride upon a similar track rail 51, both rails being secured at their front ends to a frame casting A and at their rear ends to a frame casting B and such rail members themselves forming a part of the frame of the machine.

Forwardly and rearwardly slightly beyond the ends of the track rails 50 and 51 the rollers 49 on the pivot rods connecting the two chains of gear boxes engage opposite sprocket wheels 52 which are formed with notches 53 arranged to engage the rollers in their passage from one track to the other. These sprocket wheels are fixed to cross shafts 54 and 54ª, the rear shaft 54ª being continuously driven through connections to be hereinafter described to drive the connected gear boxes and series of tumbling bucket members, which may be termed the bucket belt, in such manner as to bring the buckets successively into position to receive the coated centers from the carrier belt.

Below and adjacent the path of travel of the gear boxes along the upper reach of the bucket belt is arranged a pair of racks 55 secured to longitudinal bars C which form a part of the machine frame and are rigidly secured to the front and rear frame castings A and B. At opposite sides of the machine these racks are arranged to engage opposite and corresponding pinions 56 secured to the hubs of locking shoe members 57 rotatably mounted on cross-rods 58 journalled in the gear boxes 45 to cause a rolling, rotative movement of the pinions and connected shoe members while so engaged. These shoe members are formed with laterally projecting lugs 57ª extending into openings formed in gear wheels 59ª which are keyed to the cross-rods 58. The lugs 57ª of the shoe members are formed with studs 57ᵇ to support buffer springs 57ᶜ which form a cushioned connection between the pinions 56 and 59. The pinions 59 in turn mesh with pinions 59ᵇ fixed to short crank shaft 59ᶜ journalled in the gear boxes.

The rotary motion thus given each pair of opposite pinions 59ᵇ is employed to impart a compound vibratory movement to the corresponding box member 42 by means of counterweighted cranks 60 which are rigidly secured to the crank shafts 59ᶜ and at their ends are formed with pivot bearings in which the trunnions 44 of the box members are mounted. At the opposite ends of the box member its walls 43ª are formed with upwardly extending arms 43ᵇ which are pivotally connected by links 61 with the upper ends of upwardly extending posts 45ª integral with the corresponding gear boxes 45, this link connection operating to control the position of the box member as it is actuated by movement of the cranks 60. It results from this construction that as the cranks are rotated they will impart to the box member a rising and falling vibratory movement, and that this movement will continue so long as the pinions 56 of the corresponding gear boxes are in engagement with the racks 55.

Forwardly of the ends of the racks 55 below and adjacent the path of travel of the flat lower faces of the shoe members 57, are arranged locking rails 62 which before the pinions 56 make engagement with the racks cooperate with such shoes to prevent their rotation and rotation of the connected gear members, and rearwardly of said racks are arranged similar locking rails 63 which prevent rotation of the pinions after they have left said racks.

Secured to the cross shafts 54 and 54ª and between the pairs of sprocket wheels 52 are arranged pairs of opposite hexagonal locking wheels or plates 64 which lie in the same longitudinal plane as the locking shoe members 57 and rails 62 and 63, and which are formed with peripheral faces arranged to cooperate with the inner flat faces of such shoe members to prevent their rotation before the shoe members 57 engage the rails 62 and after they leave the rails 63. Adjacent the lower reach of the box belt the shoes cooperate with a rail 65 which in like manner prevents rotation of the gear members so that the gearing is free to rotate and cause vibration of the tumbling boxes only while it is connected with the racks.

Inasmuch as the inertia of the box belt members and connected gearing members for producing the vibrating movement above described is considerable, it is highly desirable to provide means for gradually initiating this movement before the pinions 56 engage the forward ends of the racks 55. To this end we have provided opposite pairs of reciprocating teeth 66 which engage the pinions 56 while moving with them at the same speed as the box belt, and which slow down to a momentary position of rest while the pinions enter upon engagement with the racks, after which the teeth, then disengage, return to make similar engagement with the succeeding pair of pinions.

The opposite pairs of reciprocating teeth 66 are formed upon blocks 67 which are respectively bolted to longitudinally disposed slide bars 68 equipped with wear plates $68^a$ arranged to slidingly overhang and ride upon the inner portions of the upper faces of the longitudinal frame bars C before mentioned. Secured to these slide bars 68 and in effect forming a part of them are bars 69 connected at their front ends by a cross bar 70 which extends under the frame bars C. At their rear ends the bars 69 are connected by a cross bar 71 which extends at its opposite ends beyond the side frame members of the machine and is equipped with blocks pivotally connected to pitman rods 72 by which the connected sliding frame members are reciprocated. To stiffen the cross bar 71 and strengthen the reciprocating frame such bar is provided with a truss rod $71^a$ and struts $71^b$ between the bar and truss rod.

It will be understood that since (as in the case of all reciprocating parts operated by crank connection with a rotary member) the movement of the reciprocating member accelerates from a momentary stationary position at the end of a stroke in either direction to a maximum speed at the center of the stroke, and since the gear ratios of the parts of the machine are such that the speed of the double teeth at the center of the stroke is the same as the continuous speed of the box belt, the teeth of the pinions 56 which follow the reciprocating teeth as they are beginning a stroke in a rearward direction will gain upon the double teeth during the first half of such rearward stroke, and the gear ratios and arrangement are such that they will enter into engagement with them approximately (or it may be exactly) at the middle of such stroke, at which point the shoes 57 will clear the rails 62, so that the pinions and connected gearing may be free to rotate. The slowing down of the movement of the double teeth during the last half of the rearward stroke will then initiate a rotary movement of the pinions 56 and cause an acceleration of such rotary movement until at the end of the stroke of the reciprocating teeth the pinions will be rotating at full speed as they pass off such teeth onto the racks.

Inside the path traversed by the tumbling boxes, the bucket belt is provided with a jointed shield consisting of leaves 74 which are bent each along a central line to extend under the cross rods 58 and are formed with side portions spreading at an obtuse angle and formed with spaced marginal rolls in alternating arrangement to form hinge joints 75 encircling the pivot rods 48 as pintles.

From the description of the tumbling mechanism above given it will be readily understood that the centers, individually deposited in the compartments of the tumbling boxes with a charge of loose nuts, are subjected to a vigorous tumbling action as the box members successively come into connection with racks and are given a vibratory motion, and continue such movement until the connection with the racks is broken, with the result of compacting the adherent nuts into the caramel coating and adjacent portion of the centers to form solid blocks free from the portion of the nuts which did not become attached to the conglomerate masses. Such loose nuts as are thrown out of the tumbling box by the tumbling action are caught by the jointed shield and carried rearwardly to the rear loop of the belt where they are then discharged upon the top of an endless return belt 77 by means of which they are returned to an elevator mechanism discharging into the supply hopper 7 before mentioned.

These coated centers in the present instance are dumped out of the buckets onto a screen consisting of a set of parallel inclined rods 76 which permit the loose nuts to fall through their interstices onto an inclined chute $76^a$, which latter directs them to the forwardly traveling top reach of the endless conveyor belt 77 before mentioned.

The driving connections by means of which the tumbling mechanism hereinbefore described is driven may vary considerably in arrangement, but a brief description of the particular means illustrated will be given.

The main drive shaft 100 of the machine, to which power is imparted from a suitable source through a large pulley 101 fast to the right hand end of said shaft, which extends across the rear end of the machine, carries upon its left end a small gear wheel 102 which meshes with a large gear wheel 103 fast upon a shaft 104 to which is secured a small gear wheel 105 at the right side of the machine. This small gear wheel meshes with a large gear wheel 106 secured to the cross shaft $54^a$ to which are fixed the pair of rear sprocket wheels 53 which drive the bucket belt and through such belt drive the front sprocket wheels 53 secured to the cross shaft 54.

A small sprocket wheel 107 on the left end of the shaft $54^a$ is in the present instance employed to drive a sprocket chain 108 and through a second sprocket wheel on a cross shaft 110 actuate a discharge conveyor 111 to convey the coated and compacted centers to a point beyond the present machine for further treatment.

Fast to the front cross shaft 54 to which the front sprocket wheels are secured is secured a large gear wheel 112 arranged to mesh with a small gear wheel 113 secured to a through shaft 114. This shaft is equipped at its opposite ends with a pair of wrist plates 115 formed with wrist pins 116 arranged to operate the pair of pitman rods 72 which are pivotally connected to opposite ends of the rear cross rod 71 forming part of the reciprocating frame on which the double teeth 66 of the tumbling mechanism are carried.

It is obvious that while the tumbling bucket members may be divided into compartments for use in such machines as the one above particularly described, this multiple compartment form of bucket or box members may not in all cases be necessary or desirable, and also that by minor changes in size or proportion of parts our tumbling machine may readily be adapted to operate upon other materials than those hereinbefore mentioned, for a variety of purposes.

We claim:

1. In a tumbling mechanism, an endless traveling belt, a series of tumbling bucket members mounted on said belt, and means for imparting a vibrating movement to said buckets.

2. In a tumbling mechanism, an endless traveling belt, a series of tumbling bucket members mounted on said belt, a rack adjacent and parallel the top reach of said belt, and connections intermediate said rack and tumbling buckets arranged to impart a vibratory movement to said buckets.

3. In a tumbling mechanism, an endless traveling belt, a series of tumbling bucket members mounted on said belt, a rack adjacent and parallel the top reach of said belt, connections intermediate said rack and tumbling buckets arranged to impart a vibratory movement to said buckets, and means for preventing vibration of said tumbling buckets while disconnected from said rack.

4. In a tumbling mechanism, two sets of gear boxes pivoted together to form a pair of opposite endless chains, rotating supporting members for driving said chains, crank members pivotally mounted in said gear boxes, opposite racks adjacent the path of the gear boxes on the upper reach of said chains, gearing in said boxes intermediate said racks and cranks, and tumbling bucket members connected to opposite gear boxes members and arranged to be vibrated by the corresponding cranks pivoted in said boxes.

5. In a tumbling mechanism, two sets of gear boxes pivoted together to form a pair of opposite endless chains, rotating supporting members for driving said chains, crank members pivotally mounted in said gear boxes, opposite racks adjacent the path of the gear boxes on the upper reach of said chains, gearing in said boxes intermediate said racks and cranks, posts on said gear boxes extending outwardly from their path of travel, tumbling box members pivotally mounted adjacent their centers in the ends of corresponding cranks, and links pivoted at one end to opposite ends of said tumbling box members above their center and pivoted at their other ends to said posts.

6. In a tumbling mechanism, a traveling belt having opposite jointed links, rotating supporting members for driving said belt, at least one set of gear boxes carried by the links on one side, a rack adjacent the upper reach of travel of said gear boxes, crank members journaled in said gear boxes, gearing in said boxes intermediate said rack and cranks, posts rigidly connected with said links, and tumbling box members carried by said links and flexibly connected above the tops of said box members with said posts, the box members being pivotally connected with said cranks below such flexible connection.

7. A mechanism according to claim 6 in which said intermediate mechanism includes a pinion meshing with said rack and having a cushioned connection with the crank shaft of said crank member.

8. A mechanism according to claim 6 in which said intermediate mechanism includes a pinion meshing with said rack, a second pinion having a cushioned connection with said first mentioned pinion, and a third pinion fast to the shaft of said crank member and meshing with said second mentioned pinion.

9. In a tumbling mechanism, a traveling belt having opposite jointed links, rotating supporting members for driving said belt, at least one set of gear boxes carried by the links on one side, a rack adjacent the upper reach of travel of said gear boxes, tumbling box members carried by said links, gear connections in said gear boxes intermediate said rack and tumbling box members arranged to impart a vibratory movement to such box members, a locking shoe connected to a gearing member, and cooperating locking members connected with said rotating supporting members and carried by the frame of the machine adjacent the path of the shoe and arranged to prevent rotation of the shoe and connected gearing when out of connection with the rack.

10. In a tumbling mechanism, a traveling belt having opposite jointed links, rotating supporting members for driving said belt, at least one set of gear boxes carried by the links on one side, a rack adjacent the upper reach of travel of said gear boxes, tumbling box members carried by said links, gear connections in said gear boxes intermediate said rack and tumbling box members arranged to impart a vibratory movement to such box members, a locking shoe connected to a gearing member, and means for preventing rotation of said gear connections when disconnected from said rack.

11. In a tumbling mechanism, a traveling belt having opposite jointed links, rotating supporting members for driving said belt, at least one set of gear boxes carried by the links on one side, a rack adjacent the upper reach of travel of said gear boxes, gear connections in said gear boxes intermediate said rack and tumbling box members including each a pinion meshing with said rack and a locking shoe secured thereto and a second pinion connected with said shoe and a third pinion meshing with said second pinion and having a shaft secured to a crank shaft, said tumbling box members being each pivoted to a crank arm and also being flexibly connected beyond said crank arm pivot to said link member, and cooperating locking members connected with said rotating supporting members and carried by the frame of the machine adjacent the path of the shoe and arranged to prevent rotation of the shoe and connected gearing when out of connection with the rack.

12. In a tumbling mechanism, an endless traveling belt having uniform motion, a series of tumbling box members carried by said belt, a rack adjacent the top reach of said belt, gear connections individual to each tumbling box member including a pinion arranged to enter into and pass out of meshed engagement with said rack, and means for gradually starting rotation of said pinions before the beginning of its engagement with the rack.

13. In a tumbling mechanism, an endless traveling belt having uniform motion, a series of tumbling box members carried by said belt, a rack adjacent the top reach of said belt, gear connections individual to each tumbling box member including a pinion arranged to enter into and pass out of meshed engagement with said rack, and a small group of reciprocating teeth arranged to come in mesh with each pinion in succession a short distance in advance of the rack while such teeth are moving at belt speed and to slow down to stationary position immediately adjacent the rack.

14. In a tumbling mechanism, an endless traveling belt having uniform motion, a series of tumbling box members carried by said belt, a rack adjacent the top reach of said belt, gear connections individual to each tumbling box member including a pinion arranged to enter into and pass out of meshed engagement with said rack, a small group of teeth in alignment with said rack at its front end and arranged to reciprocate longitudinally to and from the rack, and a crank arranged to reciprocate said teeth, said teeth being arranged to make engagement while moving with the belt at the middle of their traverse and reach the end of the rack at the end of such traverse.

15. In a tumbling mechanism, opposite pairs of gear boxes, through pivot rods connecting opposite boxes to form an endless belt, rollers at opposite ends of said pivot rods, pairs of rotary supporting members at the opposite loops of the belt arranged to engage said rollers, an opposite pair of tracks on the machine frame arranged to support said rollers on the upper reach of the belt, and tumbling box members flexibly mounted on said gear boxes and arranged to be automatically vibrated by movement of the belt.

16. In a tumbling mechanism, opposite pairs of gear boxes, through pivot rods connecting opposite boxes to form an endless belt, rollers at opposite ends of said pivot rods, pairs of rotary supporting members at the opposite loops of the belt arranged to engage said rollers, an opposite pair of tracks on the machine frame arranged to support said rollers on the upper reach of the belt, tumbling box members flexibly mounted on said gear boxes, gearing in said gear boxes operatively connected with said tumbling box members and arranged to vibrate the same, and a rack on the machine frame adjacent the path of the gear boxes at the upper reach of the belt and arranged to engage the gearing of such gear boxes during their passage along the rack.

17. In a tumbling mechanism, opposite pairs of gear boxes, through pivot rods connecting opposite boxes to form an endless belt, rollers at opposite ends of said pivot rods, pairs of rotary supporting members at the opposite loops of the belt arranged to engage said rollers, upper and lower pairs of tracks on the machine frame between said loops arranged to support on said gear boxes and arranged to be automatically vibrated by movement of the belt.

18. In a tumbling mechanism, opposite pairs of gear boxes, through pivot rods connecting opposite boxes to form an endless belt, means for driving said belt, vibrating tumbling boxes on said belt, and a jointed shield comprising leaves hinged to said pivot rods.

19. In a tumbling mechanism, opposite pairs of gear boxes pivoted together on opposite sides to form an endless belt, means for driving said belt, a pair of opposite racks on the machine frame adjacent the path of said boxes in the upper reach of the belt, vibratory tumbling box members mounted on pairs of opposite gear boxes, and gearing in said gear boxes arranged to operatively connect said rack and tumbling boxes, said gearing including opposite pinions fast to a through pivot rod.

20. In a tumbling mechanism, opposite pairs of gear boxes pivoted together on opposite sides to form an endless belt, means for driving said belt, a pair of opposite racks on the machine frame adjacent the path of said boxes in the upper reach of the belt, vibratory tumbling box members mounted on pairs of opposite gear boxes, and gearing in said gear boxes arranged to operatively connect said rack and tumbling boxes, said gearing including opposite pinions fast to a through pivot rod and also including buffer connections between such pinions and the tumbling box members connected to them.

ANNA G. KING,
*Administratrix of the Estate of Roy D. King, Deceased.*
HERBERT J. MELVILLE.
WILLIAM SWIFT LORD.